(No Model.)
D. R. KINYON.
FRICTION CLUTCH.
No. 281,700. Patented July 24, 1883.
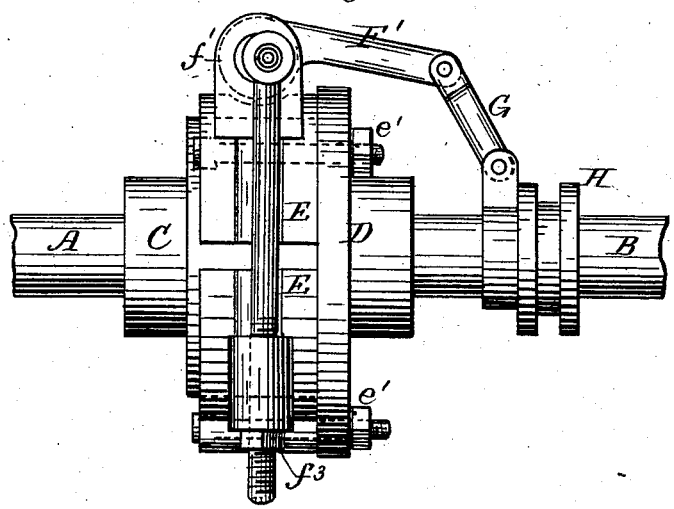
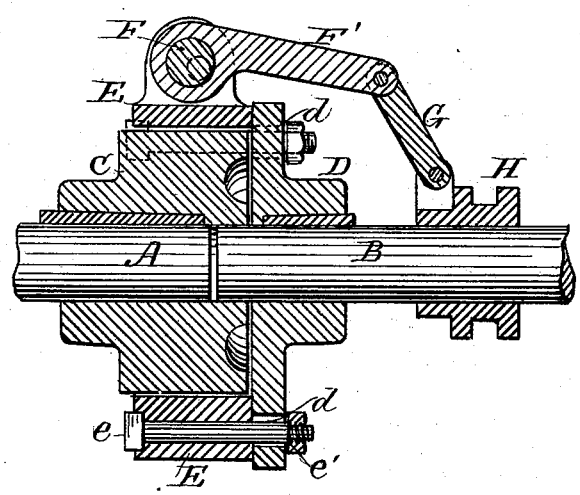
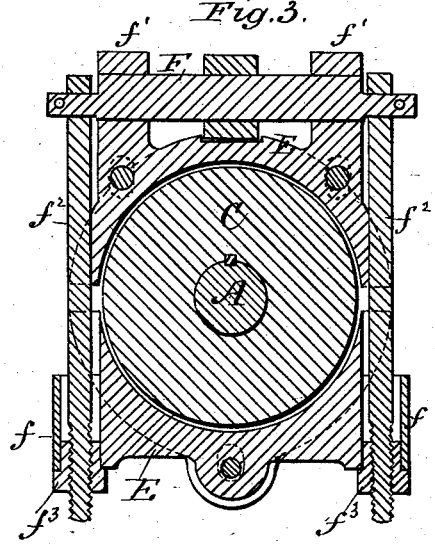
Witnesses:
L. C. Hills
W. B. Masson
Inventor
D. Randolph Kinyon
by E. E. Masson
atty.

UNITED STATES PATENT OFFICE.

D. RANDOLPH KINYON, OF RARITAN, NEW JERSEY, ASSIGNOR OF ONE-HALF TO JOB C. KINYON, OF SAME PLACE.

FRICTION-CLUTCH.

SPECIFICATION forming part of Letters Patent No. 281,700, dated July 24, 1883.

Application filed May 11, 1883. (No model.)

*To all whom it may concern:*

Be it known that I, D. RANDOLPH KINYON, a citizen of the United States, residing at Raritan, in the county of Somerset and State of New Jersey, have invented certain new and useful Improvements in Friction-Clutches, of which the following is a specification.

The object of my invention is to provide a friction-clutch which shall present a large frictional surface at such points as shall give the greatest leverage and require the slightest relative movement of the principal elements involved.

The mechanism employed and its construction and operation will be hereinafter described, and the novel features thereof specifically set forth in the claims.

Referring to the accompanying drawings, forming a part hereof, Figure 1 is a side elevation, and Figs. 2 and 3 a longitudinal and transverse section, respectively, of a clutch constructed in accordance with my invention.

Like letters refer to like parts in all the figures.

A represents a shaft, which may be designated as the "driving" shaft, and B a separate shaft, herein designated the "driven" shaft. To the driving-shaft is keyed, or otherwise secured so as to rotate therewith, a pulley, C, which constitutes one of the principal elements of the clutch. To the driven shaft B is, in like manner, secured a disk, D, which is provided with (in this instance three) slots $d$, through which bolts $e$ pass loosely, each being provided with a shoulder, $e'$, against which its nut abuts to prevent binding lengthwise in the slots. These bolts serve to connect to the disk D two half-rings, E, in such manner that they may move radially in and out upon the disk, and thus be caused to bear upon or be held away from the periphery of the pulley C.

Each of the half-rings is provided with lugs $f f f' f'$, the former bored vertically and the latter transversely, the first to receive suspension rods or bolts $f^2$, hanging from an eccentric shaft, F, mounted in the second series of lugs. The lower ends of the rods $f^2$ are screw-threaded and provided with nuts $f^3$, to take up undue looseness of the half-rings occasioned by wear or otherwise.

A lever, F', projects from the eccentric F, and is connected by a link, G, to a sliding collar, H, mounted on the shaft B. Said collar is annularly grooved, as shown, for the reception of any well-known operating-lever.

The operation is apparent. Motion, being given to the shaft A, is conveyed to the pulley C, fixed thereon. Now, if the collar H is moved toward the disk D, the lever F' is raised and the eccentric rotated, so as to depress the upper half-ring E and raise the rods $f^2$ and the lower half-ring E suspended thereon, thus bringing both half-rings toward each other and firmly upon the periphery of the pulley C, and by the friction of these parts upon each other the motion is conveyed to the disk D and the shaft B, to which it is fixed.

By this construction a slight movement is required in the half-rings, and hence I am enabled to employ the limited but exceedingly powerful movement of an eccentric clamping or wedging device, as F, and the surface contact is of such a nature and form as to create great friction without undue strains in the parts in use.

If desired, the shaft A may be continuous, in which case the disk D would be loosely mounted thereon, and provided with or connected to any suitable belt-pulley to drive any desired mechanism.

Having described my invention and its operation, what I claim as new, and desire to secure by Letters Patent, is—

1. In a friction-clutch, a driving-shaft and a driven shaft, a disk carrying half-rings, and an eccentric adapted to force said half-rings upon the periphery of a pulley mounted upon the driving-shaft, in combination with bolts carried upon the ends of the eccentric shaft and take-up nuts, substantially as specified.

2. The combination of the shaft A and a pulley, C, with the shaft B, disk D, slotted as at $d$, bolts $e$, half-rings E, provided with lugs, rods $f^2$, eccentric F, and means for its rotation, substantially as shown and described.

3. The combination of the pulley C, the eccentric shaft F, rods $f^2$, and take-up nuts $f^3$ with clamps E, substantially as and for the purpose described.

In testimony whereof I affix my signature in presence of two witnesses.

D. RANDOLPH KINYON.

Witnesses:
L. K. VREDENBURGH,
A. H. DAYTON.